(12) United States Patent
Yamamoto et al.

(10) Patent No.: US 11,005,244 B2
(45) Date of Patent: May 11, 2021

(54) COVERING AND WIRE HARNESS

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Satoshi Yamamoto, Mie (JP); Makoto Higashikozono, Mie (JP); Kazuyoshi Ohara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/497,009

(22) PCT Filed: Mar. 12, 2018

(86) PCT No.: PCT/JP2018/009381
§ 371 (c)(1),
(2) Date: Sep. 24, 2019

(87) PCT Pub. No.: WO2018/180395
PCT Pub. Date: Oct. 4, 2018

(65) Prior Publication Data
US 2020/0099205 A1 Mar. 26, 2020

(30) Foreign Application Priority Data
Mar. 30, 2017 (JP) .............................. JP2017-067397

(51) Int. Cl.
*B60N 2/06* (2006.01)
*H02G 11/00* (2006.01)
(Continued)

(52) U.S. Cl.
CPC ....... *H02G 3/0437* (2013.01); *B60R 16/0215* (2013.01); *H02G 3/0418* (2013.01); *H02G 11/00* (2013.01); *B60N 2/06* (2013.01)

(58) Field of Classification Search
CPC ... B60R 16/02; B60R 16/037; B60R 16/0215; H02G 3/04; H02G 3/0468; H02G 3/0487;
(Continued)

(56) References Cited

U.S. PATENT DOCUMENTS 3,363,050 A * 1/1968 Martin .................. H02G 3/045
174/101
3,473,769 A * 10/1969 James ..................... F16L 3/015
248/69

(Continued)

FOREIGN PATENT DOCUMENTS

JP 2001-221292 A 8/2001
JP 2007-135299 A 5/2007
(Continued)

OTHER PUBLICATIONS

International Search Report dated May 1, 2018 for WO 2018/180395 A1.

*Primary Examiner* — Timothy J Thompson
*Assistant Examiner* — Michael F McAllister
(74) *Attorney, Agent, or Firm* — Abelman, Frayne & Schwab

(57) ABSTRACT

Disclosed is a covering including: a strip-shaped portion that extends along an electric wire and being bendable; a pair of side wall portion rows provided with the electric wire being interposed therebetween, and in each of which a plurality of pairs of side wall portions extending upward from the strip-shaped portion are arranged in a direction in which the strip-shaped portion extends; and a lid portion that is disposed opposing the strip-shaped portion and keeps the electric wire that is interposed between the pair of side wall (Continued)

portion rows from coming out of the covering. The lid portion includes spacer portions that are respectively inserted in a gap between adjacent side wall portions and in a gap between adjacent side wall portions in the side wall portion rows and maintain a spacing between the adjacent side wall portions and at least a predetermined spacing between the adjacent side wall portions.

6 Claims, 17 Drawing Sheets

(51) Int. Cl.
*H02G 3/04* (2006.01)
*B60R 16/02* (2006.01)

(58) Field of Classification Search
CPC .... H02G 3/0437; H02G 3/0418; H02G 11/00; B60N 2/06
USPC ........................................................ 174/68.3
See application file for complete search history.

(56) References Cited

U.S. PATENT DOCUMENTS

| | | | | |
|---|---|---|---|---|
| 5,322,480 | A * | 6/1994 | Meier | F16G 13/16 |
| | | | | 174/97 |
| 6,012,683 | A * | 1/2000 | Howell | F16L 3/26 |
| | | | | 174/101 |
| 7,428,808 | B2 * | 9/2008 | Utaki | H02G 11/006 |
| | | | | 248/49 |
| 2001/0025715 | A1 * | 10/2001 | Muller | F16L 3/26 |
| | | | | 174/19 |
| 2005/0155338 | A1 | 7/2005 | Wehler et al. | |
| 2009/0266045 | A1 * | 10/2009 | Utaki | F16G 13/16 |
| | | | | 59/78.1 |
| 2014/0339376 | A1 * | 11/2014 | Katou | B60R 16/027 |
| | | | | 248/49 |
| 2015/0360629 | A1 * | 12/2015 | Sekino | B60R 16/0215 |
| | | | | 174/68.3 |

FOREIGN PATENT DOCUMENTS

| | | |
|---|---|---|
| JP | 2013-049402 A | 3/2013 |
| JP | 2016-111790 A | 6/2016 |

* cited by examiner

COVERING AND WIRE HARNESS

CROSS REFERENCE TO RELATED APPLICATIONS

This application is a national phase of PCT application No. PCT/JP2018/009381, filed on 12 Mar. 2018, which claims priority from Japanese patent application No. 2017-067397, filed on 30 Mar. 2017, all of which are incorporated herein by reference.

TECHNICAL FIELD

The specification of the present application discloses a technique related to a covering and a wire harness.

BACKGROUND

Some slidable automobile seats are equipped with electric equipment such as an electric reclining apparatus or a seat heater. A wire harness that connects the electric equipment to a device or the like mounted on a vehicle body is required to follow sliding of the seat, and thus needs to be configured to allow the routing path of the wire harness to bend and absorb an excess length of the wire harness. A wire harness disclosed in Patent Document 1 includes a rectangular tubular protector in which a plurality of cutting lines are formed in the length direction in a spaced-apart manner. The cutting lines are formed in three out of four sides of the rectangular tubular protector, and no cutting line is formed on one side of the rectangular tubular protector. Accordingly, the protector easily bends toward the side on which the cutting lines are formed. When a seat leg portion slides, an excess length portion of the wire harness covered with the protector is housed into an excess length absorbing box disposed on a side portion of a seat rail after the routing path of the wire harness is bent into a U shape, with the side on which the cutting lines are formed facing inward.

PRIOR ART DOCUMENT

Patent Document

Patent Document 1: JP 2013-49402A

SUMMARY OF THE INVENTION

Problems to be Solved

The protector described above is configured to be capable of easily bending toward the side on which the cutting lines are formed, but the protector is not configured to restrict warping toward a side opposite to the routing path of the protector and twisting in the rotation direction. If such warping or twisting occurs in the protector, the protector may bend in a direction different from the routing path, and come into contact with the inner surface of the rail, or come into contact with a protector that is bent into a U shape and extends in parallel, thereby causing damage to the protector.

A technique described in the specification of the present application has been accomplished under the circumstances described above, and it is an object of the specification of the present application to prevent a covering from bending in a direction different from the routing path of a wire harness.

Means to Solve the Problem

The technique described in the specification of the present application provides a covering through which an electric wire can be passed and that allows for bending of a routing path of the electric wire, the covering including: a strip-shaped portion that extends along the electric wire in a strip shape and is bendable; a pair of side wall portion rows between which the electric wire being interposed, and in each of which a plurality of pairs of side wall portions extending upward from the strip-shaped portion are lined up in a direction in which the strip-shaped portion extends; and a lid portion that is disposed opposing the strip-shaped portion and keeps the electric wire that is interposed between the pair of side wall portion rows from coming out of the covering, wherein the lid portion includes a spacer portion that is inserted in a gap between adjacent side wall portions in the plurality of pairs of side wall portions in the side wall portion rows so as to maintain at least a predetermined spacing between the adjacent side wall portions.

According to the configuration described above, when the covering is bent in one direction (in the direction of the routing path), the strip-shaped portion bends and the spacing between adjacent side wall portions increases, and thereby the routing path of the covering can be bent. On the other hand, when the covering is bent in a direction different from the one direction, because the spacer portion of the lid portion is inserted in the gap between adjacent side wall portions, at least a predetermined spacing between the side wall portions is maintained. As a result, the covering is kept from warping and twisting, and it is therefore possible to prevent the covering from bending in a direction different from the routing path.

The following are preferred embodiments of the technique described in the specification of the present application.

The spacer portion includes: a first spacer portion that is provided between adjacent side wall portions in one of the pair of side wall portion rows so as to maintain at least a predetermined spacing between the adjacent side wall portions; and a second spacer portion that is provided between adjacent side wall portions in the other side wall portion row so as to maintain at least a predetermined spacing between the adjacent side wall portions.

With this configuration, in both side wall portion rows, the first spacer portion and the second spacer portion keep adjacent side wall portions from coming closer to each other, and it is therefore possible to further prevent the covering from bending in a direction different from the routing path.

The spacer portion includes a first rib, and a second rib that is connected to the first rib and extends in such a direction that it intersects with the first rib, and a fitting portion, into which the first rib and the second rib are fitted, is formed between adjacent side wall portions in the side wall portion rows.

With this configuration, as a result of the first rib and the second rib being fitted into the fitting portion, the adjacent side wall portions can be kept from moving in a direction in which they intersect with each other, and it is therefore possible to further prevent the covering from bending in a direction different from the routing path.

The lid portion includes a plurality of lid portions, and each of the lid portions includes the spacer portion.

With this configuration, the covering can be formed by simply assembling a plurality of lid portions, and thus the assembling step can be simplified.

Also, a wire harness is provided that includes: the covering; and an electric wire that is passed through the covering.

The wire harness is configured to be capable of moving along with sliding of a sliding member of a vehicle.

Effect of the Invention

With the technique described in the specification of the present application, it is possible to prevent the covering from bending in a direction different from the routing path of the wire harness.

DETAILED DESCRIPTION TO EXECUTE THE INVENTION

Embodiment

An embodiment will be described with reference to FIGS. 1 to 17.

A wire harness 10 according to the present embodiment is routed between, for example, a vehicle body and a seat 50 (an example of "sliding member") of a vehicle such as an automobile.

Figure 1:
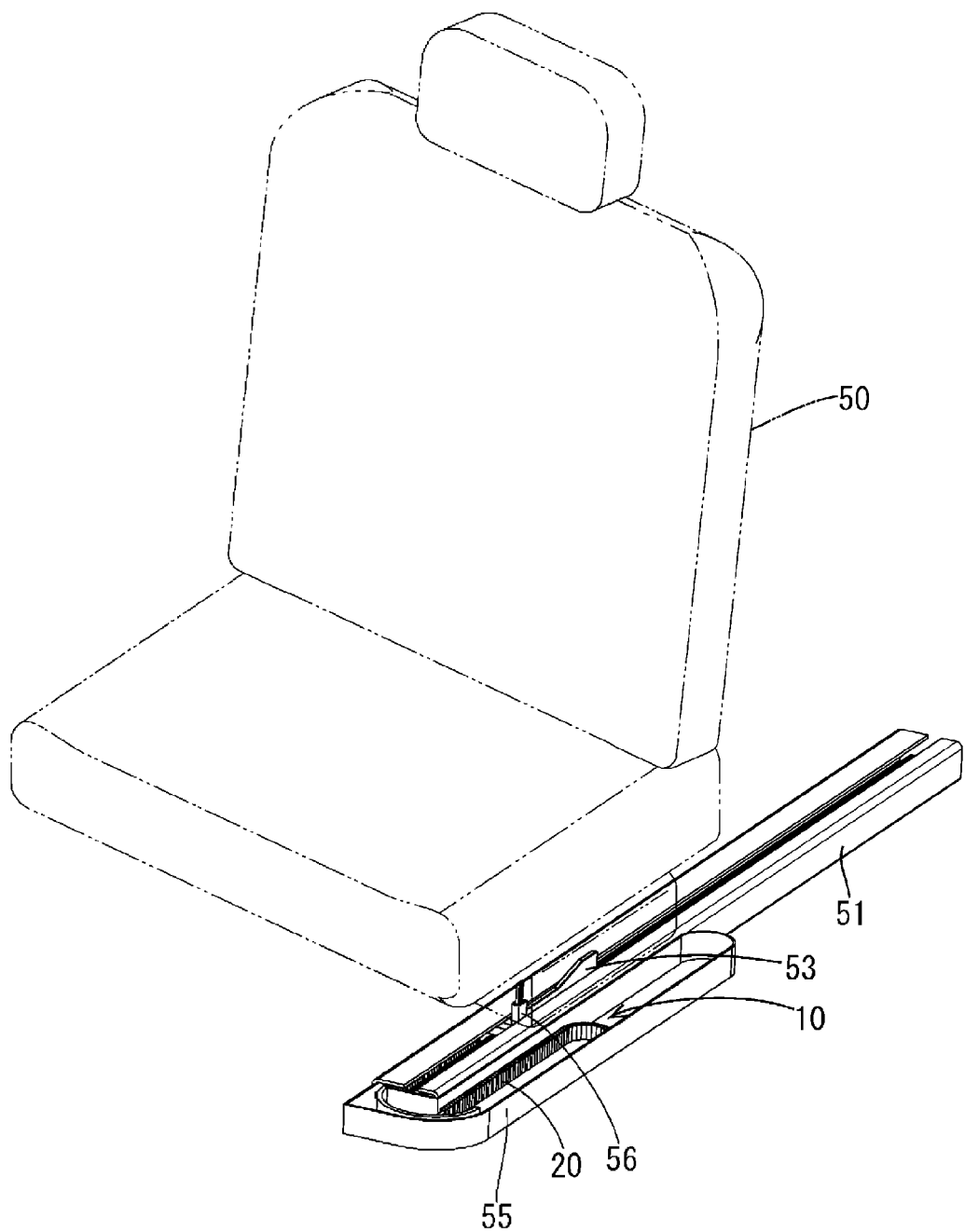
FIG. 1 is a perspective view of a seat according to an embodiment.
Figure 2:
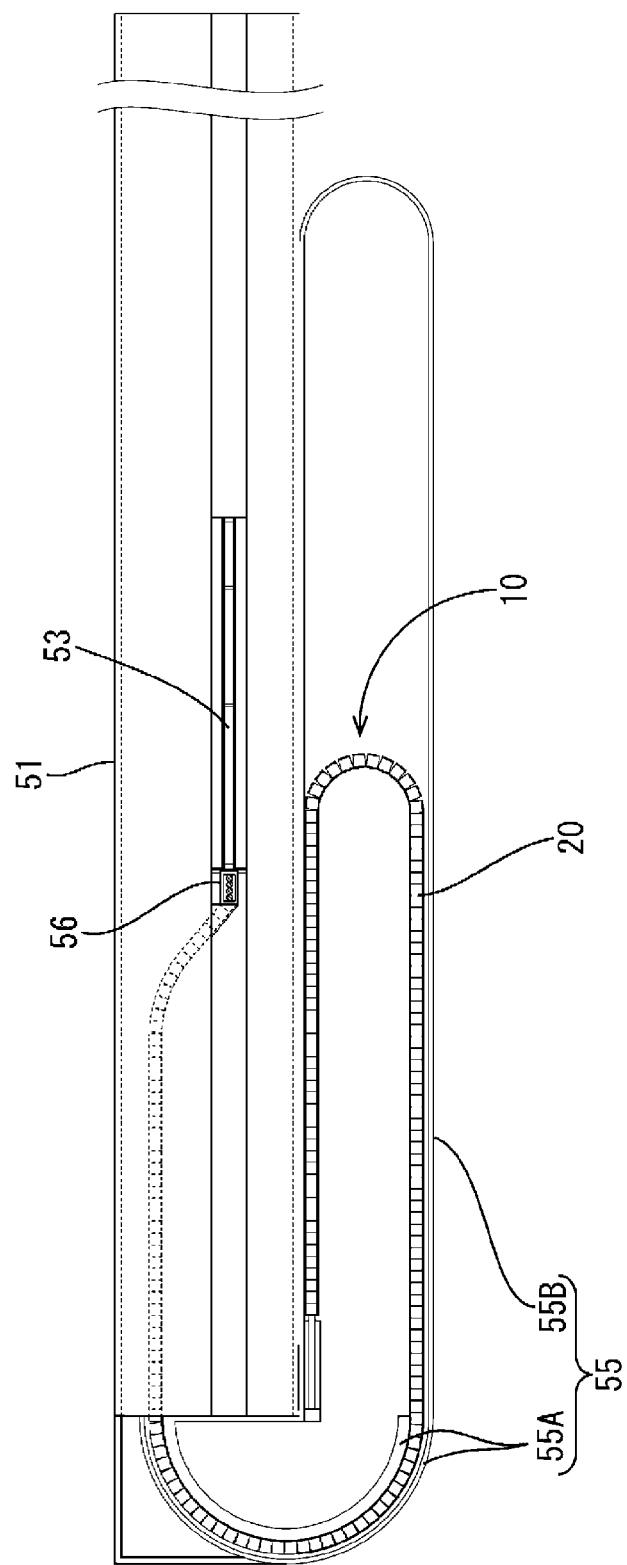
FIG. 2 is a plan view of a wire harness when it is routed in a rail and an excess length absorbing member.

As shown in FIGS. 1 and 2, the seat 50 is configured to be slidable in the front-back direction along a pair of metal rails 51 that are fixed on the floor of the cabin of the unshown vehicle body (FIG. 1 shows only one of the rails 51, and the other rail is not shown). The seat 50 is equipped with various types of electric equipment such as, for example, an electric reclining apparatus, a seat heater, a sensor for detecting whether or not a person has seated on the seat, and a sensor for detecting whether or not the seatbelt has been fastened. In the rail 51, which is one of the rails 51, a slidable slider 53 is disposed on the rail 51, and the underside of the seat 50 is fixed to the slider 53.

At a position adjacent to the front side and the lateral side of the rail 51, an excess length absorbing member 55 is provided in which an excess length portion of the wire harness is housed. The excess length absorbing member 55 includes a U-shaped groove-like bent portion 55A and a housing 55B. When the seat 50 slides in the front direction, the wire harness 10 in the rail 51 moves in the front direction, and the excess length portion of the wire harness 10 is housed into the housing 55B through the bent portion 55A. The wire harness 10 is passed through a guide member 56, which is made of a synthetic resin that is fixed to a front end portion of the slider 53 in the rail 51, and the direction of electric wires 11 is changed toward the seat 50 side by the guide member 56. The wire harness 10 is drawn out of the rail 51 and the excess length absorbing member 55, and routed on or underneath the floor (a mat, a panel, or the like) of the vehicle body, and connected to, for example, a device such as an ECU (Electronic Control Unit).

Wire Harness 10

Figure 3:
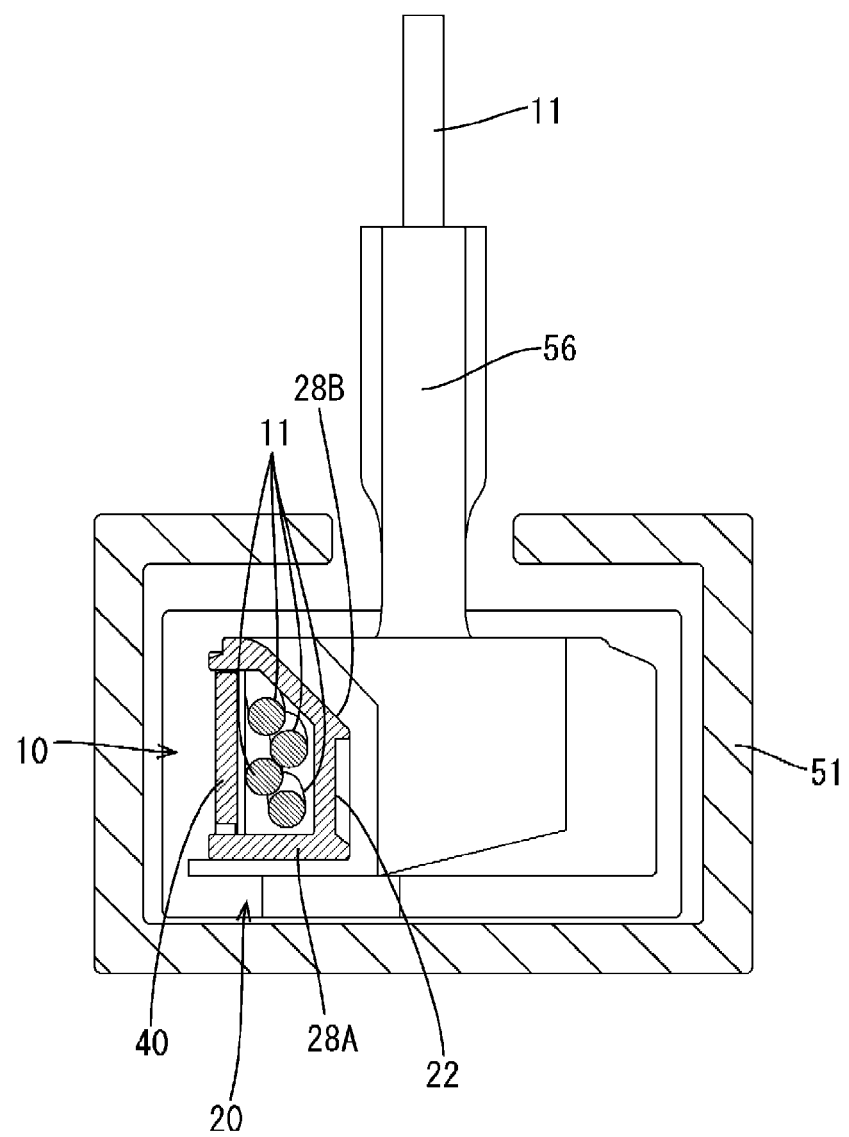
FIG. 3 is a cross-sectional view of the wire harness when it is routed in the rail.
Figure 4:
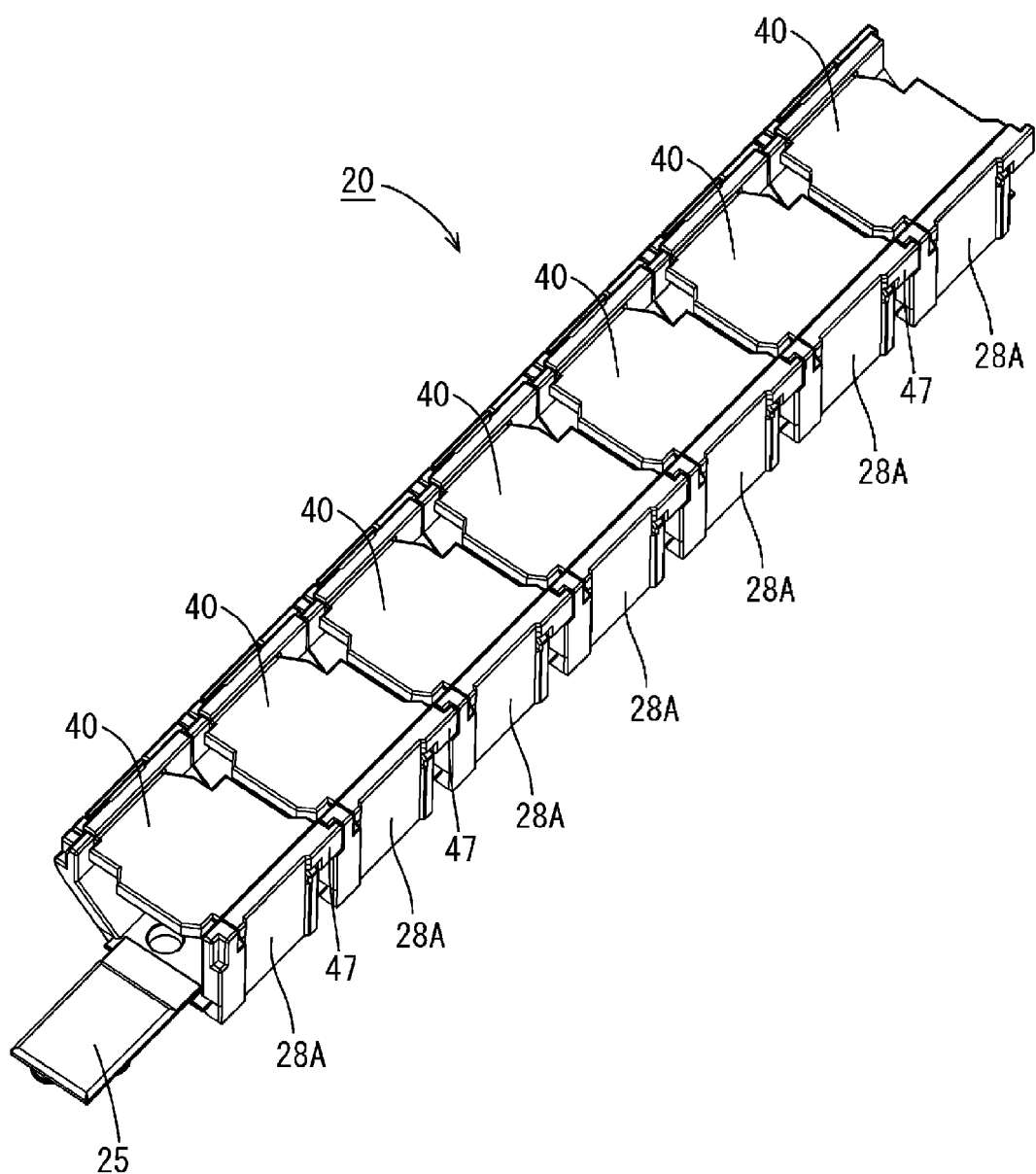
FIG. 4 is a perspective view of a covering.

As shown in FIG. 3, the wire harness 10 includes a plurality of (four in the present embodiment) electric wires 11 and a rectangular tubular covering 20 through which the plurality of electric wires 11 are passed and that protects the electric wires 11. Each electric wire 11 is a coated electric wire in which a conductor portion made of copper, a copper alloy, aluminum, an aluminum alloy, or the like is coated with an insulating layer. As the conductor portion, for example, a stranded wire, in which a plurality of metal wires are stranded together, or a single core wire can be used.

Covering 20

Figure 10:
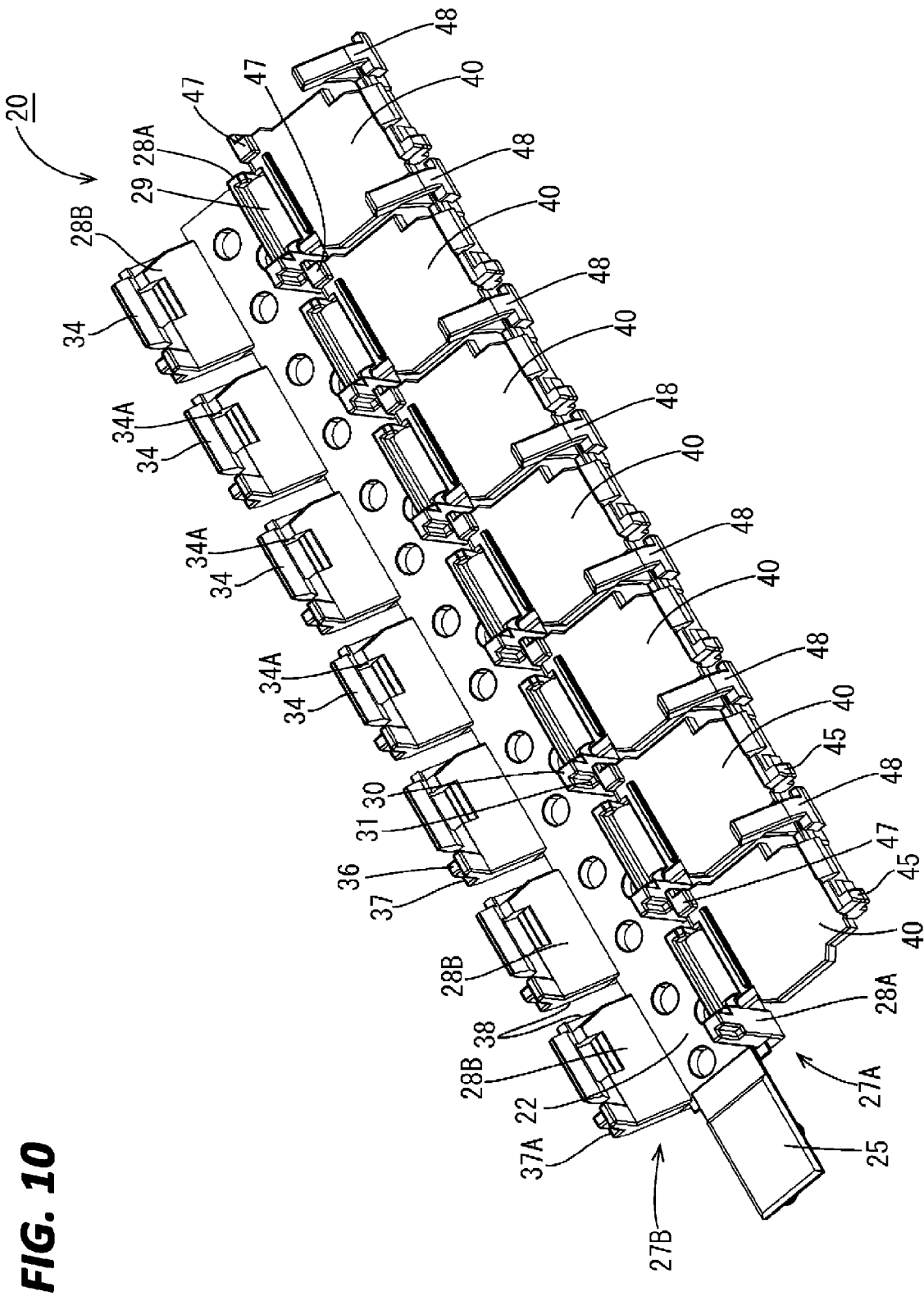
FIG. 10 is a perspective view of the covering, with its lid portions being open.

The covering 20 is made of a synthetic resin. As shown in FIG. 10, the covering 20 includes: a strip-shaped portion 22 that extends along the electric wires 11 in a strip shape; a pair of side wall portion rows 27A and 27B that are provided, with the plurality of electric wires 11 being interposed therebetween, and in which a pair of side wall portions 28A and 28B are arranged in the front-back direction; and a plurality of lid portions 40 that are pivotally connected to the top end portions of the side wall portions 28A, respectively. The covering 20 is disposed in the rail 51 and the excess length absorbing member 55 such that the strip-shaped portion 22 serves as a side face and the strip-shaped portion 22 serves is bendable inwardly. For the sake of simplifying the description, the following description will be given assuming that the X direction shown in FIG. 9 corresponds to the front direction, the Y direction shown in FIG. 9 corresponds to the left direction, and the Z direction shown in FIG. 8 corresponds to the upper direction.

Strip-Shaped Portion 22

Figure 13:
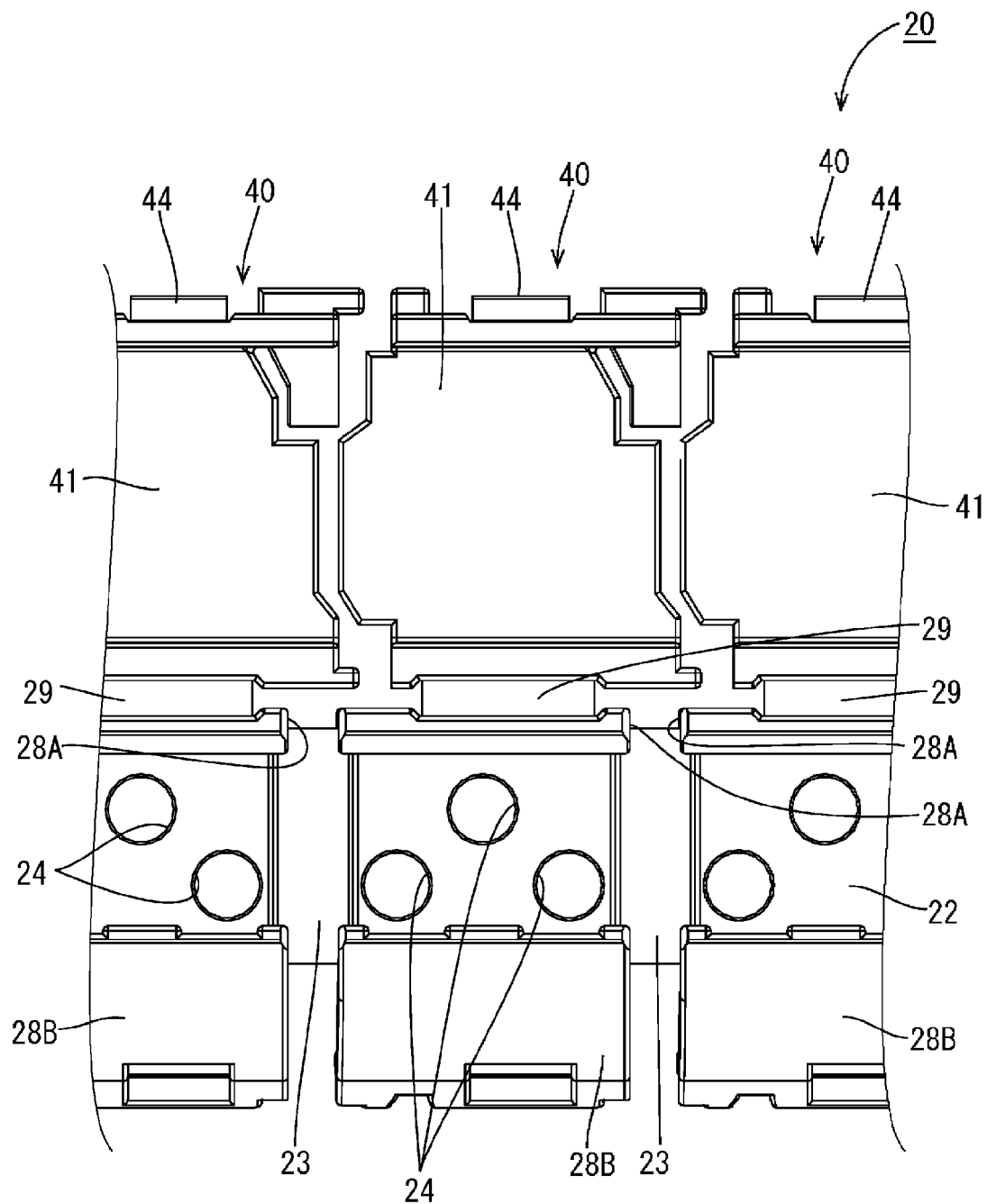
FIG. 13 is a bottom view of the covering, with its lid portions being open.

The strip-shaped portion 22 has a flat plate shape that is elongated in the front-back direction. As shown in FIG. 13, a plurality of flexible portions 23 are formed at predetermined intervals in the front-back direction. Each flexible portion 23 is formed to have a thickness dimension that is reduced in order to allow bending and deforming as a result of the lower surface (outer surface) side being cut out over the entire width, which thereby allows the strip-shaped portion 22 to bend in a direction which intersects with the surface of the strip-shaped portion 22. In the strip-shaped portion 22, in a region between adjacent flexible portions 23 (between a pair of side wall portions 28A and 28B), a plurality of (three in the present embodiment) circular punched-out portions 24 are formed that extend through the strip-shaped portion 22, with one of the punched-out portions 24 being formed at a position close to a side wall portion 28A, and two punched-out portions 24 being formed at a position close to another side wall portion 28B.

Figure 12:
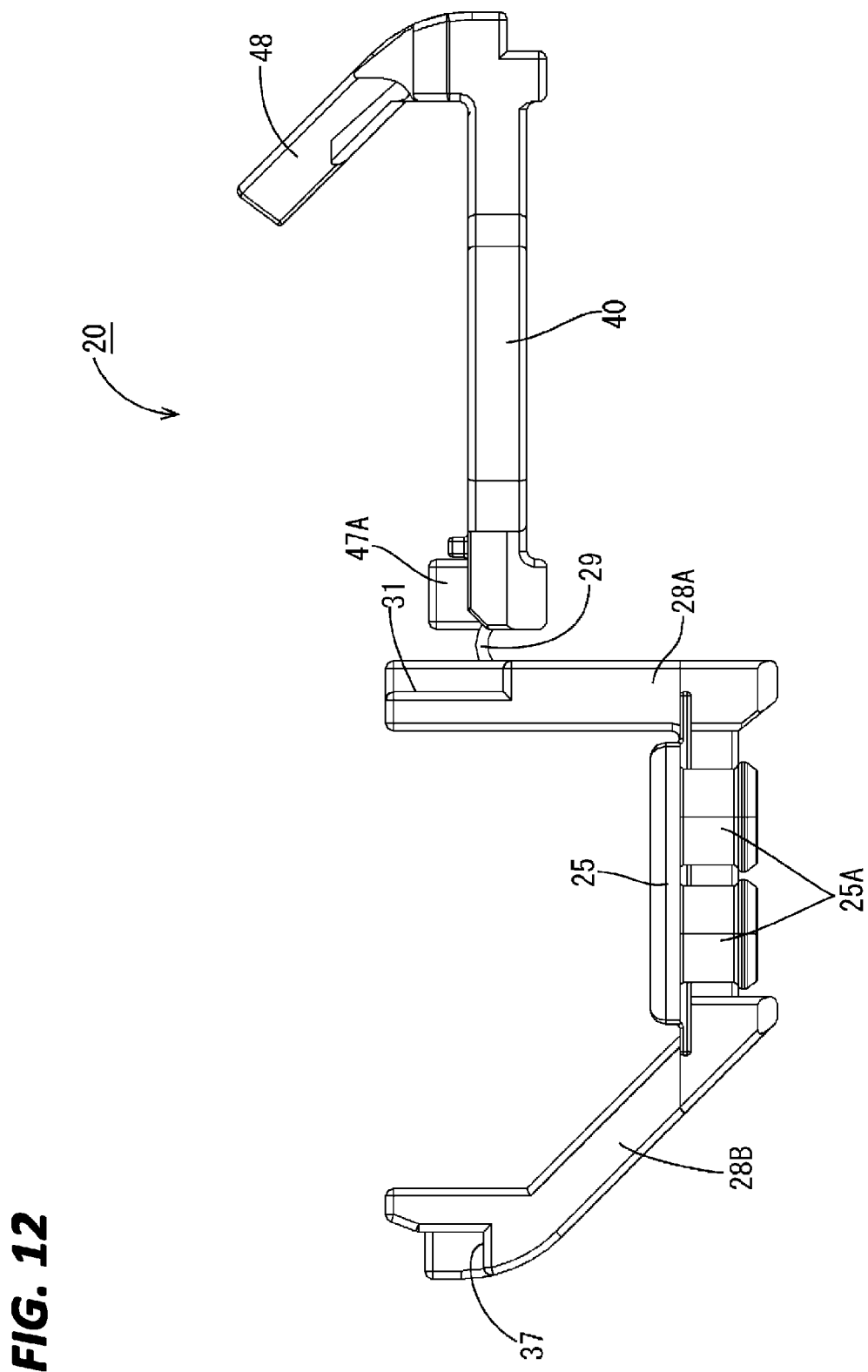
FIG. 12 is a front view of the covering, with its lid portions being open.

As shown in FIG. 12, one end portion of the strip-shaped portion 22 is provided with a connector piece 25 that protrudes in the front direction (in the connection direction) relative to the front ends of the pair of side wall portions 28A and 28B. A plurality of (three in the present embodiment) connector protruding portions 25A are formed on one surface of the connector piece 25. A plurality of coverings 20 are connected in the front-back direction as a result of the connector protruding portions 25A being fitted into punched-out portions 24 that are formed in an end portion of the strip-shaped portion 22 of another covering 20 to be connected, the end portion having no connector piece 25 formed therein.

Pair of Side Wall Portion Rows 27A and 27B

As shown in FIG. 10, in the pair of side wall portion rows 27A and 27B, a plurality of (seven in the present embodiment) pairs of side wall portions 28A and 28B are arranged in the front-back direction (the direction in which the strip-shaped portion 22 extends). Each pair of side wall portions 28A and 28B includes a first side wall portion 28A that extends upward from one side edge portion of the strip-shaped portion 22 and a second side wall portion 28B that extends upward from the other side edge portion of the strip-shaped portion 22.

Figure 11:
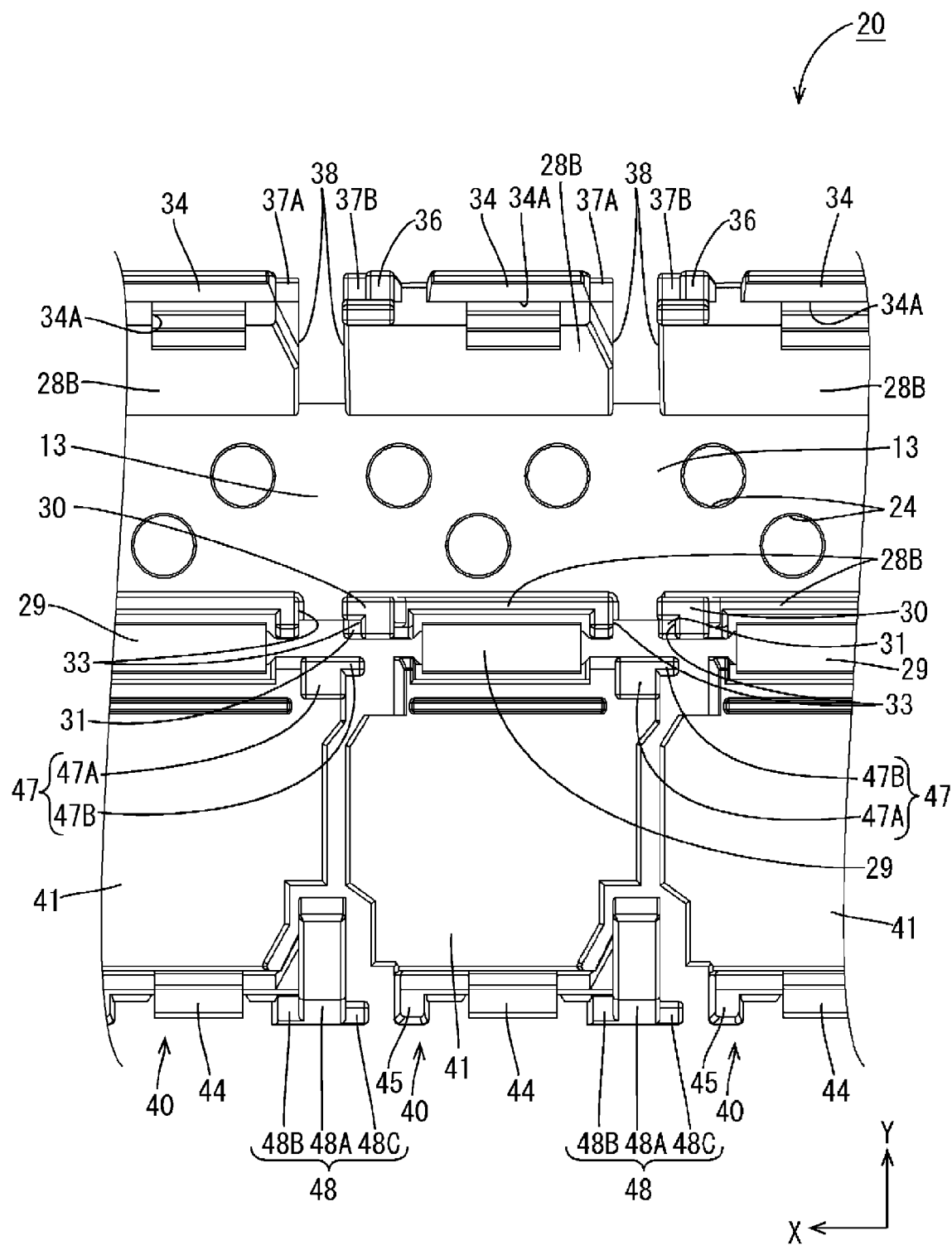
FIG. 11 is a partially enlarged plan view of the covering, with its lid portions being open.

The first side wall portion 28A extends upward in a direction perpendicular to the surface of the strip-shaped portion 22, and as shown in FIG. 11, a lid portion 40 is connected to an upper end portion (top end portion) of the first side wall portion 28A via a hinge portion 29. A first spacer portion 47 (an example of a "spacer portion") of the lid portion 40, which will be described later, is inserted between adjacent first side wall portions 28A in the front-back direction, and thereby the adjacent first side wall portions 28A are kept from coming closer to each other by at least a predetermined distance. A receiving portion 30 for receiving the first spacer portion 47 is formed in a front end portion of each first side wall portion 28A. The receiving portion 30 has a rectangular prism shape that extends upward from one side edge portion of the strip-shaped portion 22 and protrudes in the upper direction. At top of the receiving portion 30, a fitting recess portion 31 that is a rectangular parallelepiped cutout is formed. A region between a first side wall portion 28A and the receiving portion 30 (the fitting recess portion 31 thereof) functions as a fitting portion 33 into which the first spacer portion 47 is fitted.

The second side wall portion 28B extends upward while being inclined in a direction so as to form an obtuse angle with respect to the upper surface of the strip-shaped portion 22, and the second side wall portion 28B includes, at its top end portion, a frame-shaped engaging portion 34 through which an engaging hole 34A extends. At a front end portion (one end portion) of the second side wall portion 28B, a pillar portion 36 extends upward at a position spaced apart from the engaging portion 34. At an upper end portion of the pillar portion 36, a fitting recess portion 37B that is a rectangular cutout is formed. Also, at a rear end portion of the second side wall portion 28B, a fitting recess portion 37A that is a rectangular cutout is formed. The fitting recess portions 37A and 37B and opposing end surfaces of adjacent second side wall portions 28B form a fitting portion 38 into which a second spacer portion 48 (an example of a "spacer portion") of the lid portion 40, which will be described later, is fitted.

Lid Portion 40

The lid portion 40 is disposed opposing the strip-shaped portion 22 and keeps the electric wires 11 that are interposed between the pair of side wall portion rows 27A and 27B from coming out of the covering 20. The lid portion 40 includes a plate-like portion 41 that has a flat plate shape, an engaged portion 44 that is engaged with the engaging portion 34 of the second side wall portion 28B, a position retaining portion 45 that is provided at a position spaced apart from the engaged portion 44 and retains the position of the lid portion 40 by being inserted between the pillar portion 36 and the engaging portion 34, a first spacer portion 47 that keeps adjacent first side wall portions 28A from coming closer to each other by at least a predetermined distance, and a second spacer portion 48 that keeps the adjacent second side wall portions 28B from coming closer to each other by at least a predetermined distance.

The plate-like portion 41 has a substantially rectangular shape, and extends toward the receiving portion 30 of the first side wall portion 28A and is unitarily connected to the first spacer portion 47. The engaged portion 44 includes a step portion that protrudes stepwise from an end surface of the plate-like portion 41 and an inclined portion whose protruding dimension is reduced in an inclined manner. As a result of the step portion engaging with a hole edge of the engaging hole 34A, the lid portion 40 is kept closed. The position retaining portion 45 protrudes like a rod at a position spaced apart from the front side of the engaged portion 44 in the leading end portion of the plate-like portion 41, and its top end portion is slightly tapered by being cut away.

The first spacer portion 47 is connected unitarily with a corner of the plate-like portion 41. The first spacer portion 47 includes a first rib 47A that has a substantially rectangular parallelepiped shape protruding from a base end portion of the plate-like portion 41 and a plate-like second rib 47B that is formed unitarily with the corner of the first rib 47A. The first rib 47A protrudes from the surface of the plate-like portion 41 at a predetermined width dimension (a dimension in the front-back direction). The second rib 47B has a rectangular plate shape that has a surface that extends in a direction perpendicular to the surface of the plate-like portion 41, and is fitted into the fitting recess portion 31 of the receiving portion 30 with substantially no gap when the lid portion 40 is closed. With the width dimension of the first rib 47A and the second rib 47B, the spacing between adjacent first side wall portions 28A is maintained at at least a predetermined distance.

The second spacer portion 48 has a T shape, and includes a first rib 48A that is provided on the leading end side and is inserted between the end faces of adjacent second side wall portions 28B, a second rib 48C that is provided on the base end side and is inserted into the fitting recess portion 37B of the adjacent second side wall portion 28B, and a third rib 48B that is inserted into the fitting recess portion 37A. The first rib 48A has a predetermined width dimension (a dimension in the front-back direction, and extends in an inclined direction at an acute angle with respect to the plate-like portion 41. The length of the first rib 48A is set such that its leading end extends to the height of the strip-shaped portion 22. The second rib 48C and the third rib 48B extend in a direction that is perpendicular to (intersects with) the direction in which the first rib 48A extends. With the width dimension of the first rib 48A, the second rib 48C and the third rib 48B, the spacing between adjacent second side wall portions 28B is maintained at at least a predetermined distance.

Next, a description will be given of an action that occurs when a force that causes the covering 20 to bend is generated.

Figure 14:
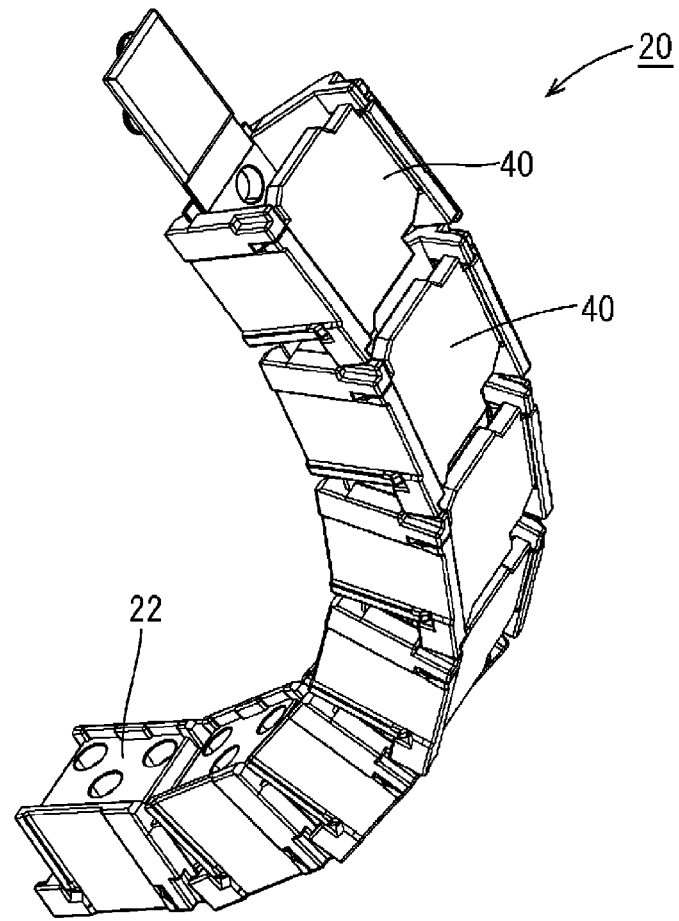
FIG. 14 is a perspective view of the covering when it is bent.
Figure 15:
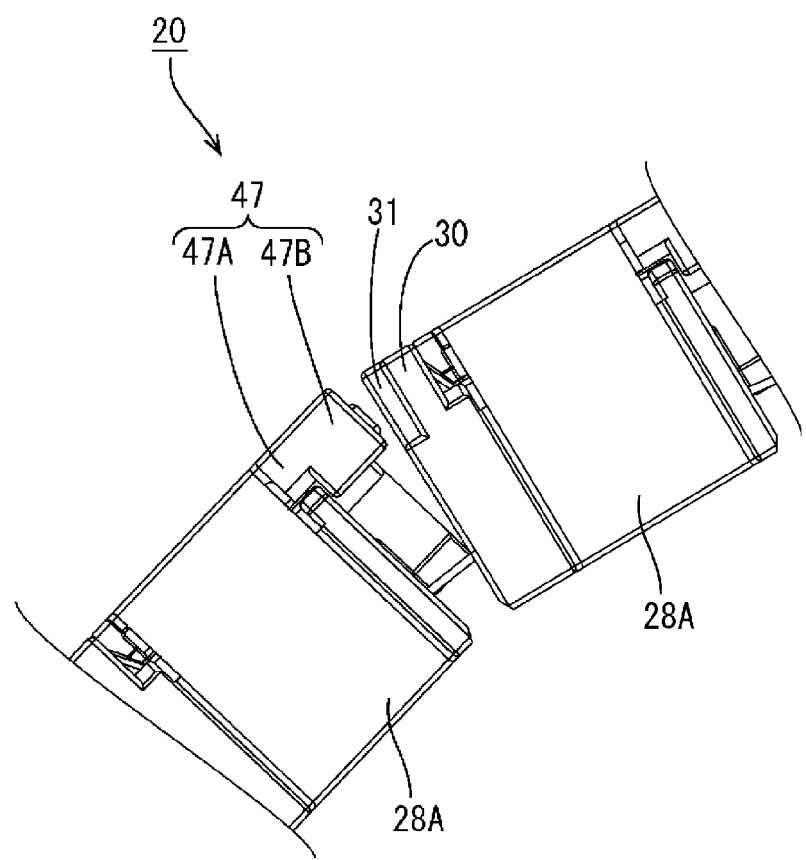
FIG. 15 is a partially enlarged right side view of the covering when it is bent.
Figure 16:
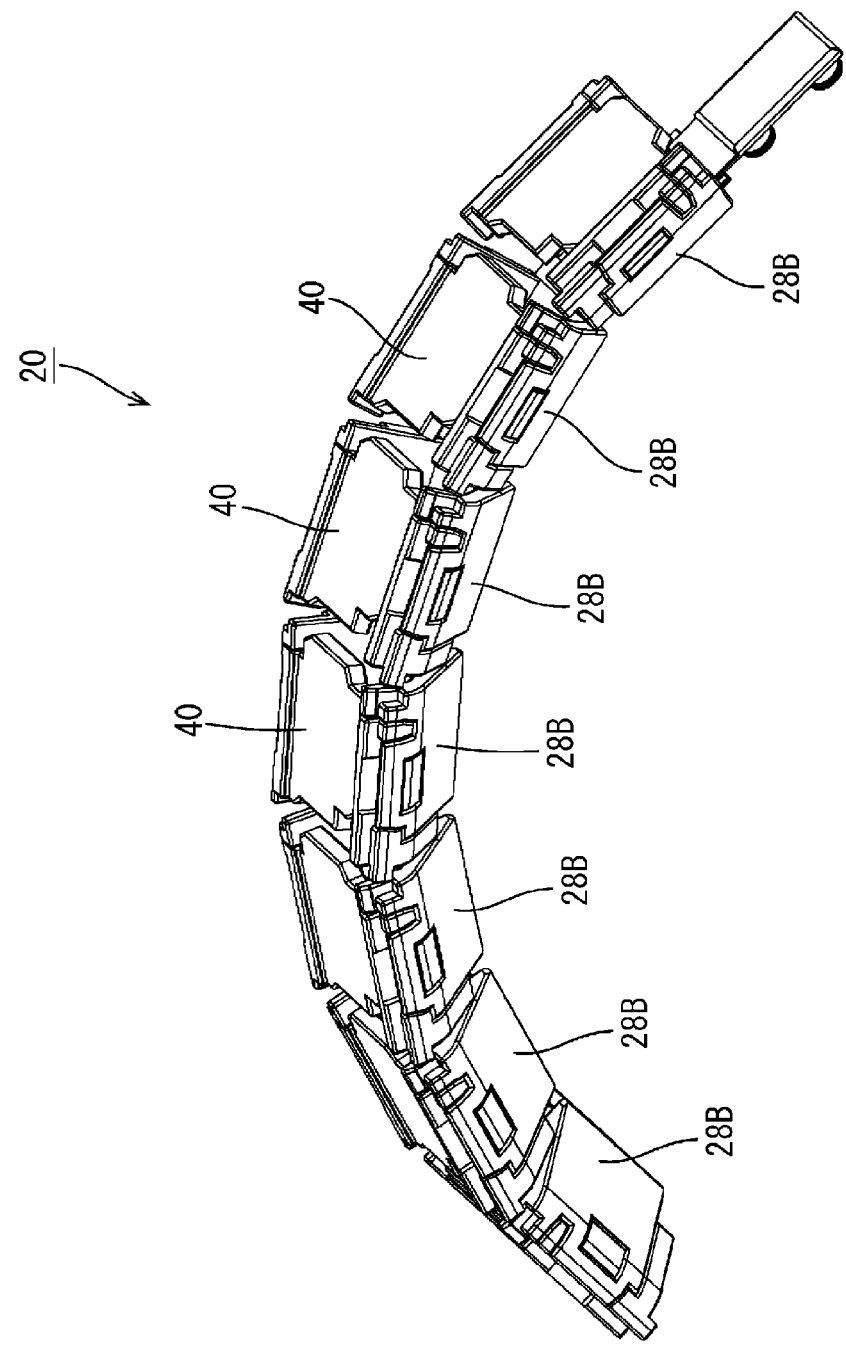
FIG. 16 is a perspective view of the covering when it is bent as viewed from a direction different from that shown in FIG. 14.
Figure 17:
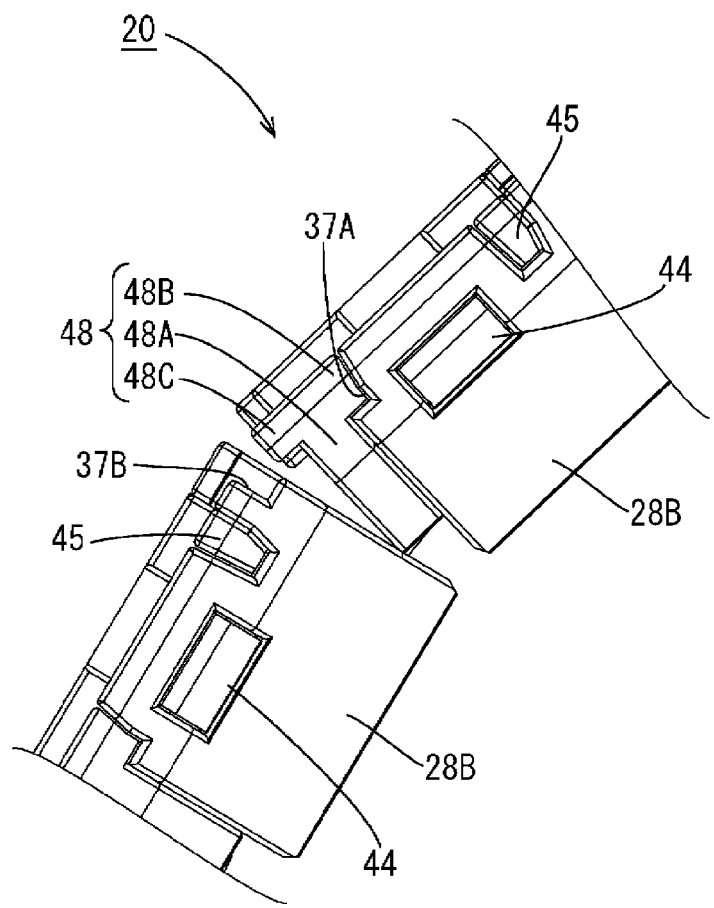
FIG. 17 is a partially enlarged left side view of the covering when it is bent.

When the covering 20 is passed through the bent portion 55A, the strip-shaped portion 22 receives a force that causes the strip-shaped portion 22 to bend inward, and thus the strip-shaped portion 22 curves inwardly as shown in FIGS. 14 and 16, and also the outer surface gap between adjacent side wall portions 28A and the outer surface gap between adjacent side wall portions 28B increase as shown in FIGS. 15 and 17.

Figure 5:
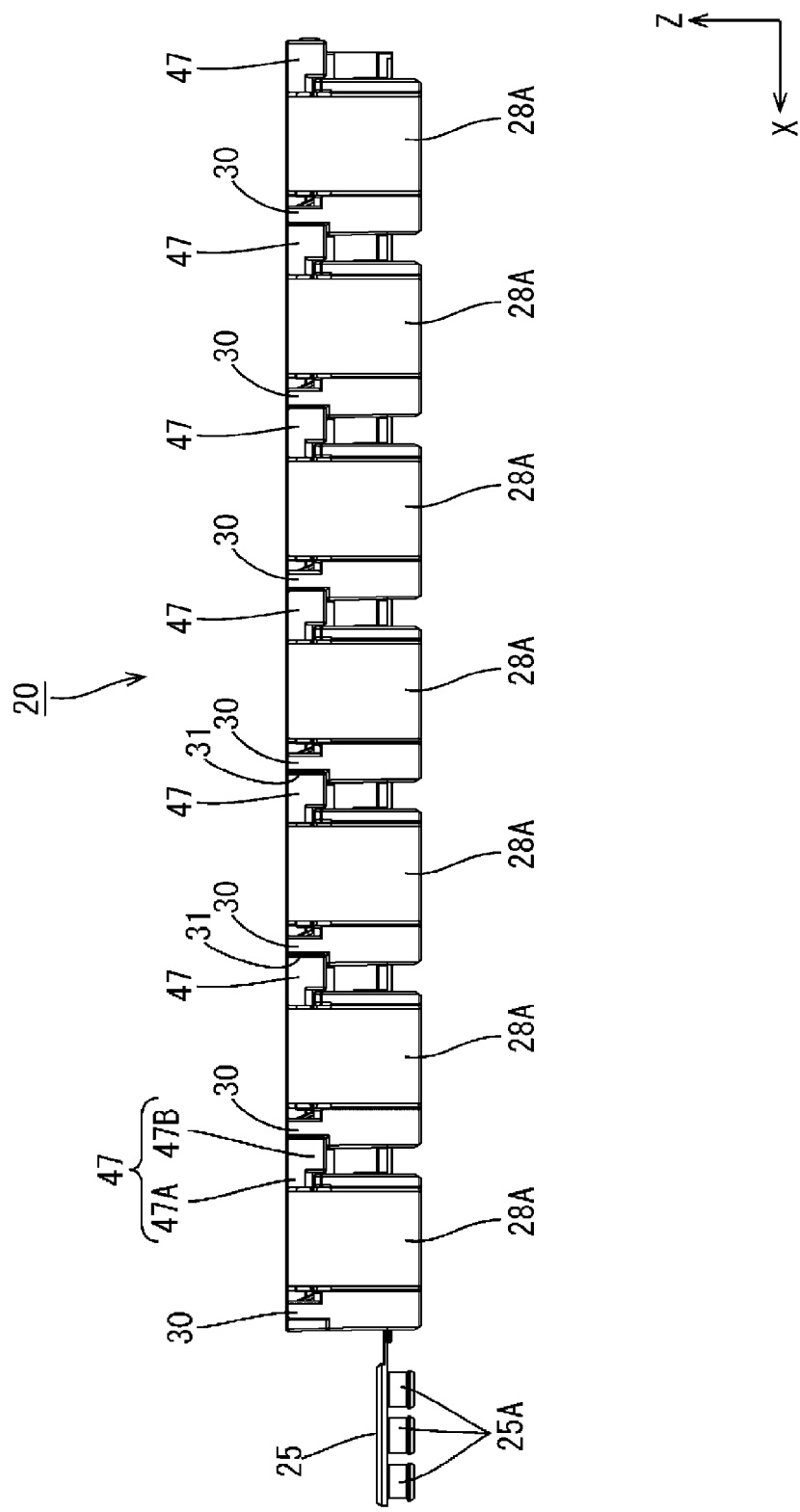
FIG. 5 is a right side view of the covering.
Figure 6:
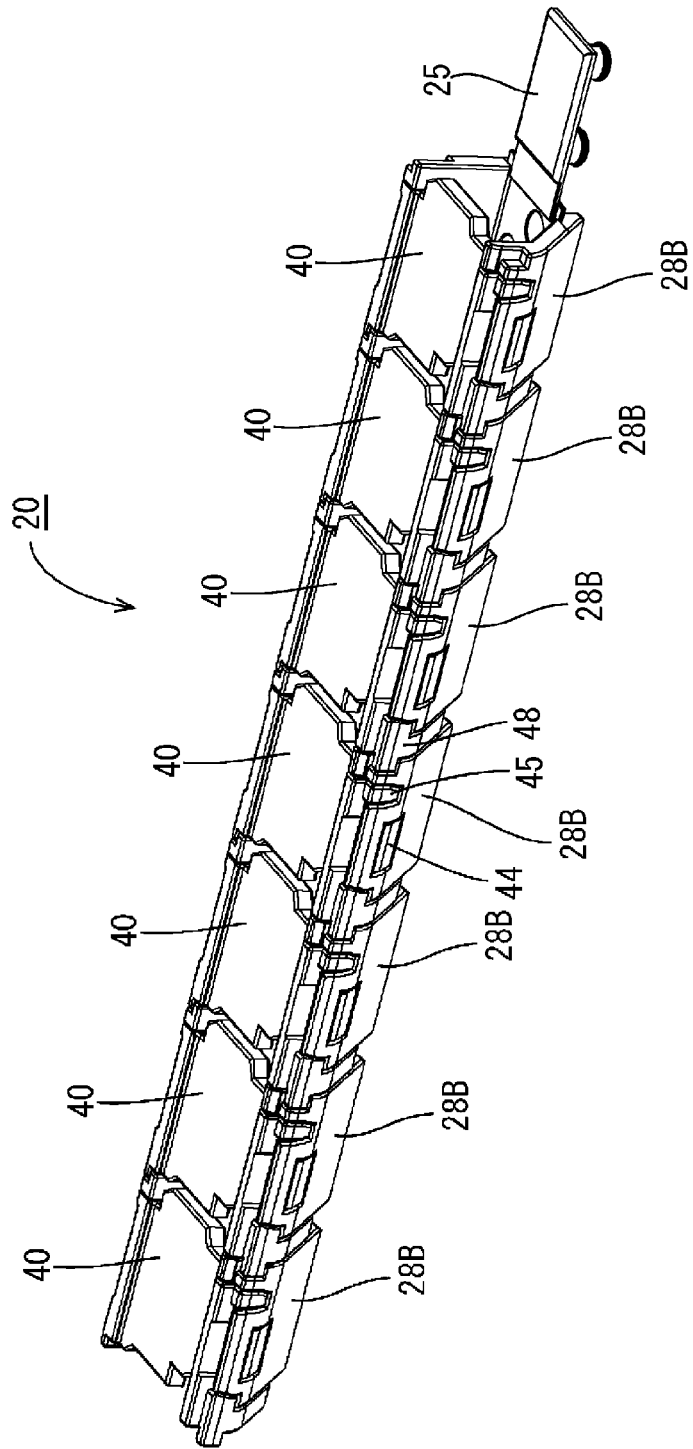
FIG. 6 is a perspective view of the covering as viewed from a direction different from that shown in FIG. 4.
Figure 7:
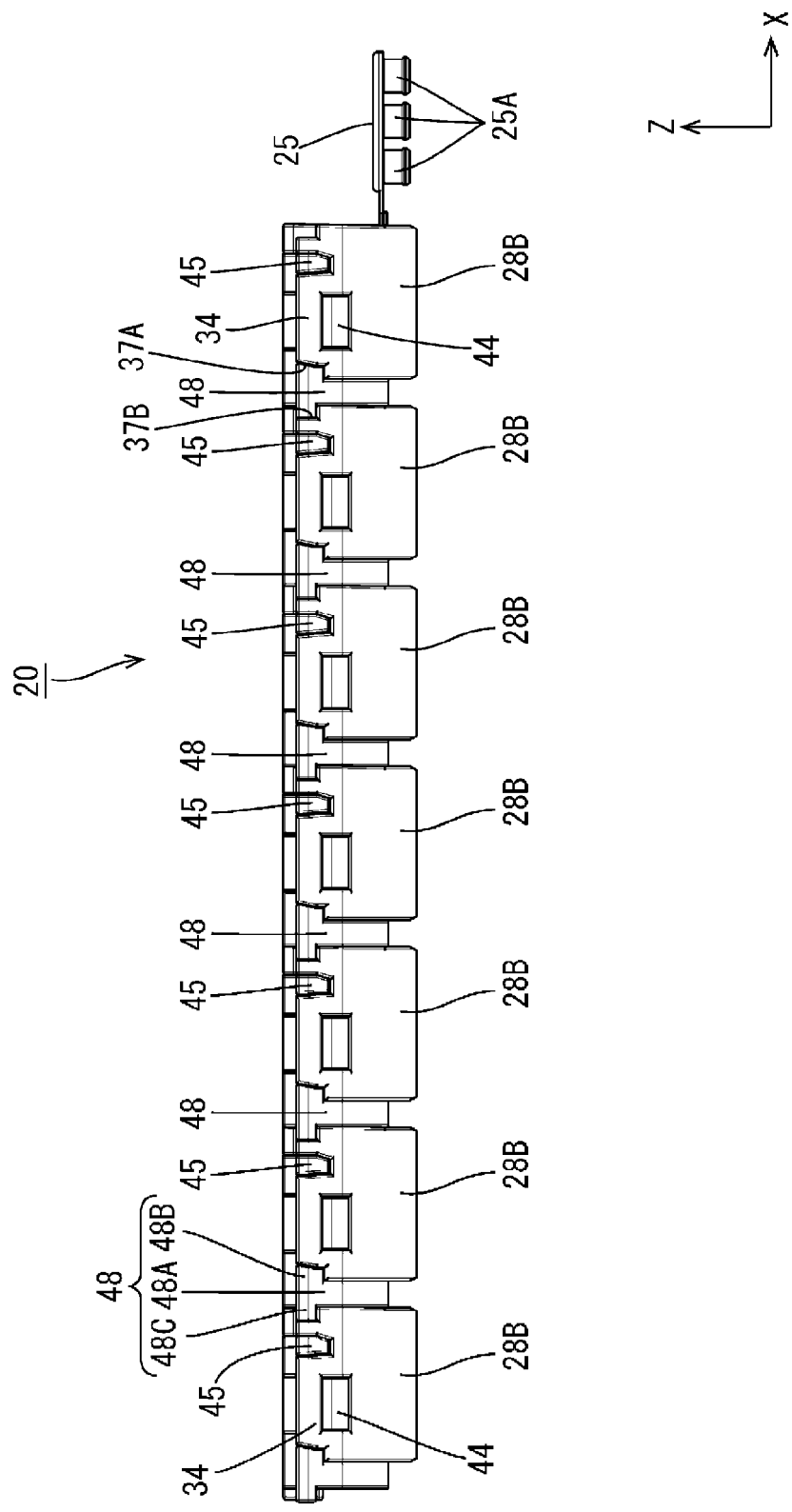
FIG. 7 is a left side view of the covering.
Figure 8:
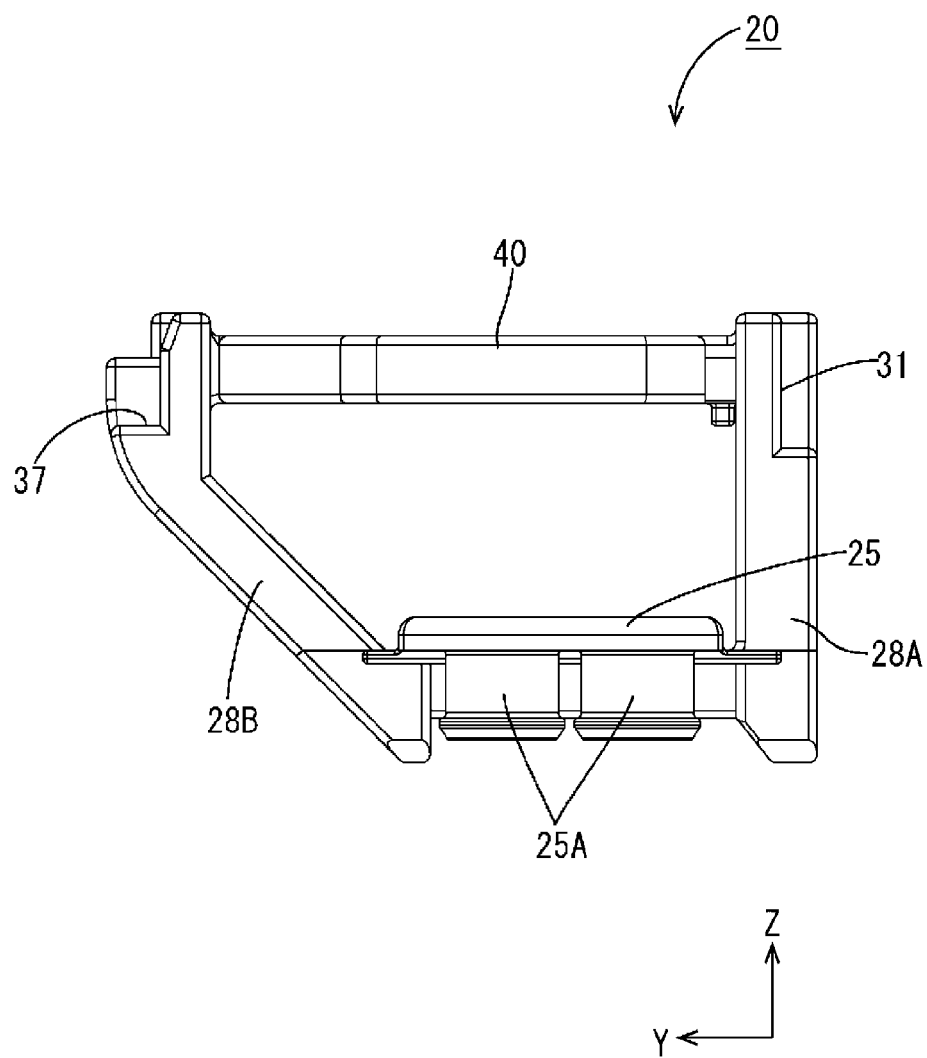
FIG. 8 is a front view of the covering.
Figure 9:
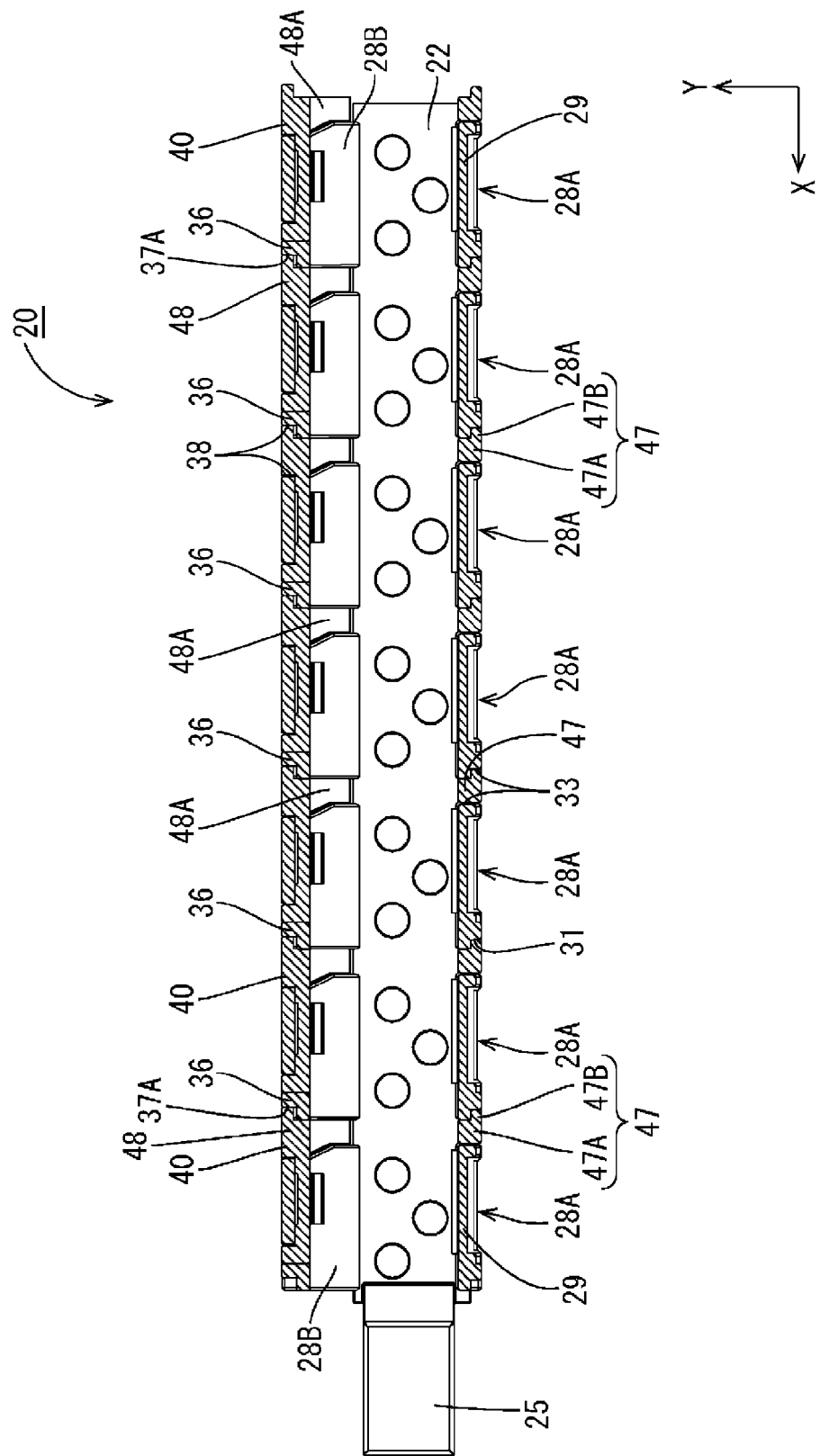
FIG. 9 is a horizontal cross-sectional view of the covering.

On the other hand, if the wire harness 10 receives a force in a warping direction or a twisting direction (rotation direction) that is opposite to the routing path, because the first spacer portion 47 is provided in the gap between each pair of adjacent side wall portions 28A, and the second spacer portion 48 is provided in the gap between each pair of adjacent side wall portions 28B in the front-back direction as shown in FIGS. 5 and 7, each pair of adjacent side wall portions 28A and 28B are kept from coming closer to each other by a dimension of the spacer portions 47 and 48 or less, and the covering 20 is kept from warping and twisting. Particularly when the covering 20 receives a force in a twisting direction, the first rib 47A is inserted between adjacent first side wall portions 28A in the front-back direction, and the rectangular second rib 47B is fitted into the fitting recess portion 31, as a result of which twisting between adjacent first side wall portions 28A is prevented. Also, as a result of the T-shaped second spacer portion 48 being fitted into the fitting portion 38 that is provided between adjacent second side wall portions 28B and is recessed stepwise from both sides, twisting between the adjacent second side wall portions 28B is restricted. Accordingly, it is possible to prevent the covering 20 from bending in a direction different from the routing path caused by twisting of the covering 20.

Actions and effects of the present embodiment will be described.

The present embodiment provides a covering 20 through which an electric wire 11 is passed and that allows a routing path of the electric wire 11 to bend, the covering 20 including: a strip-shaped portion 22 that extends along the electric wire 11 in a strip shape and is bendable; a pair of side wall portion rows 27A and 27B that are provided with the electric wire 11 being interposed therebetween, and in each of which a plurality of pairs of side wall portions 28A or 28B extending upward from the strip-shaped portion are lined up in a direction in which the strip-shaped portion extends 22; and a lid portion 40 that is disposed opposing the strip-shaped portion 22 and keeps the electric wire 11 that is interposed between the pair of side wall portion rows 27A and 27B from coming out of the covering 20, wherein the lid portion 40 includes spacer portions 47 and 48 that are respectively inserted in a gap between adjacent side wall portions 28A and in a gap between adjacent side wall portions 28B in the side wall portion rows 27A and 27B and maintain a spacing between the adjacent side wall portions 28A and at least a predetermined spacing between the adjacent side wall portions 28B.

According to the present embodiment, when the covering 20 is bent in the direction of the routing path, the strip-shaped portion 22 bends and the spacing between adjacent side wall portions 28A and 28B increases, and thereby the routing path of the covering 20 can be bent. On the other hand, when the covering 20 is bent in a direction different from the routing path of the covering 20, because the spacer portions 47 and 48 of the lid portion 40 are respectively inserted in the gap between adjacent side wall portions 28A and the gap between adjacent side wall portions 28B, and thus the spacing between the adjacent side wall portions 28A and the spacing between the adjacent side wall portions 28B are maintained at at least a predetermined distance. As a result, the covering 20 is kept from warping and twisting, and it is therefore possible to prevent the covering 20 from bending in a direction different from the routing path.

Also, the spacer portions 47 and 48 include: a first spacer portion 47 provided between adjacent side wall portions 28A in the side wall portion row 27A, which is one of the pair of side wall portion rows 27A and 27B, so as to maintain the spacing between the adjacent side wall portions 28A at at least a predetermined distance; and a second spacer portion 48 provided between adjacent side wall portions 28B in the side wall portion row 27B, which is the other side wall portion row, so as to maintain the spacing between the adjacent side wall portions 28B at at least a predetermined distance.

With this configuration, in both side wall portion rows 27A and 27B, the first spacer portion 47 and the second spacer portion 48 keep adjacent side wall portions 28A and 28B from coming close to each other, and it is therefore possible to further prevent the covering 20 from bending in a direction different from the routing path.

Also, the spacer portion 47 or 48 includes a first rib 47A or 48A, and a second rib 47B or 48C that is connected to the first rib 47A or 48A and extends (protrudes) in such a direction that it intersects with the direction (protruding direction) in which the first rib 47A or 48A extends. Also, a fitting portion 33, into which the first rib 47A and the second rib 47B are fitted, is formed between adjacent side wall portions 28A in the side wall portion rows 27A, and a fitting portion 38, into which the first rib 48A and the second rib 48C are fitted, is formed between adjacent side wall portion 28B in the side wall portion row 27B.

With this configuration, as a result of the first ribs 47A and 48A and the second ribs 47B and 48C being fitted into the fitting portions 33 and 38, adjacent side wall portions 28A and 28B can be kept from moving in a direction in which they intersect with each other, and it is therefore possible to further prevent the covering 20 from bending in a direction different from the routing path.

Also, the spacer portion 48 includes a third rib 48B, and as a result of the third rib 48B being fitted into the fitting recess portion 37A, the member constituting the plate-like portion 41 can be prevented from moving outward in the thickness direction of the second side wall portion 28B.

Also, the lid portion 40 includes a plurality of lid portions 40, each including the spacer portions 47 and 48.

With this configuration, the covering 20 can be formed by simply assembling the plurality of lid portions 40, and thus the assembling step can be simplified.

Other Embodiments

The technique described in the specification of the present application is not limited to the embodiment described above with reference to the drawings. For example, embodiments as described below are also included in the technical scope of the technique described in the specification of the present application.

(1) The angles of the first rib 47A (48A), the second rib 47B (48C), and the third rib 48B in the extending direction (protruding direction) are not limited to the angles described in the above embodiment, and may be different from the angles described in the above embodiment. For example, they may extend in a direction in which they are inclined with each other, instead of in a direction in which they are perpendicular to each other.

(2) The seat 50 is used as the sliding member, but the sliding member is not limited thereto. For example, the sliding member may be a slide door.

(3) The number of electric wires 11 that constitute the wire harness 10 is not limited to the number used in the present embodiment, and can be changed to any number. For example, the wire harness 10 may be composed of only one electric wire 11.

LIST OF REFERENCE NUMERALS

10 Wire harness
11 Electric wire
20 Covering
22 Strip-shaped portion
27A, 27B Pair of side wall portion rows
28A First side wall portion
28B Second side wall portion
31 Fitting recess portion
33 Fitting portion
37A, 37B Fitting recess portion
38 Fitting portion
40 Lid portion
47 First spacer portion (spacer portion)
47A First rib
47B Second rib
48 Second spacer portion (spacer portion)
48A First rib
48C Second rib
50 Seat (sliding member)

The invention claimed is:

1. A covering through which an electric wire can be passed and that allows for bending of a routing path of the electric wire, the covering comprising:
a strip-shaped portion that extends along the electric wire in a strip shape and is bendable;
a first side wall portion row extending along one side of the strip-shaped portion and a second side wall portion row extending along an other side of the strip-shaped portion, the electric wire being interposed between the first side wall portion row and the second side wall portion row, and in each of which a plurality of pairs of opposing side wall portions extending upward from the strip-shaped portion are lined up in a direction in which the strip-shaped portion extends; and
a lid portion that is disposed opposing the strip-shaped portion and keeps the electric wire that is interposed between the pair of side wall portion rows from coming out of the covering,
wherein the lid portion includes a first spacer portion that is inserted in a gap between adjacent side wall portions of the first side wall portion row so as to maintain at least a predetermined spacing between the adjacent side wall portions of the first side wall portion row.

2. The covering according to claim 1, further comprising:
a second spacer portion that is provided between adjacent side wall portions in the second side wall portion row so as to maintain at least a predetermined spacing between the adjacent side wall portions of the second side wall portion row.

3. The covering according to claim 1, wherein the first spacer portion includes a first rib, and a second rib that is connected to the first rib and extends in such a direction that it intersects with the first rib, and
a fitting portion, into which the first rib and the second rib are fitted, is formed between adjacent side wall portions in the side wall portion rows.

4. The covering according to claim 1, wherein the lid portion includes a plurality of lid portions, and
each of the lid portions includes the spacer portion.

5. A wire harness comprising:
the covering according to claim 1; and
an electric wire that is passed through the covering.

6. The wire harness according to claim 5, wherein the wire harness is configured to be capable of moving along with sliding of a sliding member of a vehicle.

* * * * *